(12) United States Patent
Lee et al.

(10) Patent No.: US 7,575,453 B2
(45) Date of Patent: Aug. 18, 2009

(54) ELECTRONIC MODULE LOCKING AND EJECTING APPARATUS

(75) Inventors: Guang-Yao Lee, Taipei Hsien (TW); Jing Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/033,871

(22) Filed: Feb. 19, 2008

(65) Prior Publication Data

US 2009/0149044 A1 Jun. 11, 2009

(30) Foreign Application Priority Data

Dec. 10, 2007 (CN) .................. 2007 1 0202960

(51) Int. Cl.
*H01R 13/62* (2006.01)
(52) U.S. Cl. ...................... 439/159; 439/351
(58) Field of Classification Search ............. 439/159, 439/351, 357, 367
See application file for complete search history.

(56) References Cited

U.S. PATENT DOCUMENTS

| | | | |
|---|---|---|---|
| 6,419,509 B2* | 7/2002 | Cho | 439/159 |
| 6,447,313 B1* | 9/2002 | Zuin | 439/159 |
| 6,994,574 B1* | 2/2006 | Lai | 439/159 |
| 7,070,430 B2* | 7/2006 | Yang et al. | 439/159 |
| 7,083,446 B2* | 8/2006 | Tanaka et al. | 439/159 |
| 7,198,497 B1* | 4/2007 | Lai et al. | 439/159 |
| 7,220,138 B2* | 5/2007 | Miyamoto et al. | 439/159 |
| 7,229,300 B2* | 6/2007 | Lai et al. | 439/159 |
| 7,303,413 B1* | 12/2007 | Lai et al. | 439/152 |
| 7,351,081 B1* | 4/2008 | Lai | 439/159 |
| 2001/0036759 A1* | 11/2001 | Ikemoto et al. | 439/159 |
| 2004/0242041 A1* | 12/2004 | Ngo | 439/159 |
| 2005/0070142 A1* | 3/2005 | Hanzawa et al. | 439/159 |
| 2007/0072464 A1* | 3/2007 | Anzai et al. | 439/159 |
| 2007/0207650 A1* | 9/2007 | Saito et al. | 439/159 |
| 2008/0026619 A1* | 1/2008 | Chang | 439/159 |
| 2008/0050937 A1* | 2/2008 | Miyao et al. | 439/64 |
| 2008/0248666 A1* | 10/2008 | Kinoshita et al. | 439/159 |
| 2009/0042439 A1* | 2/2009 | Yin | 439/544 |

* cited by examiner

*Primary Examiner*—Ross N Gushi
(74) *Attorney, Agent, or Firm*—Frank R. Niranjan

(57) ABSTRACT

A locking and ejecting apparatus includes a carriage for holding an electronic module having a connector therein, a sliding bracket slid in the carriage, a mating connector attached to the sliding bracket for connecting with the connector, a triggering portion formed on the sliding bracket, a push-push switch attached to the carriage, and a resilient member. Two actuated retaining pieces are formed on the push-push switch, and a trigger is set between the retaining pieces. When the sliding bracket is slid relative to the carriage, the resilient member is deformed and the trigger is triggered by the triggering portion, the retaining pieces are actuated to hold the triggering portion, the sliding bracket is locked in the carriage. When the trigger is triggered again, the retaining pieces are actuated to release the triggering portion, the sliding bracket is ejected out of the carriage by a restoring force of the resilient member.

15 Claims, 4 Drawing Sheets

ELECTRONIC MODULE LOCKING AND EJECTING APPARATUS

BACKGROUND

1. Field of the Invention

The present invention relates to electronic module locking and ejecting apparatuses, and more particularly to an electronic module locking and ejecting apparatus of a computer chassis.

2. Description of Related Art

A variety of electronic modules such as hard disk drives, optical disk drives, and other equivalent storage devices are often used in computer systems. These storage devices may be coupled to and removed from the computer systems by means of a securing apparatus. However, conventional securing apparatuses are complicated and unreliable.

What is desired, therefore, is an electronic module locking and ejecting apparatus for providing reliable installation and easy removal of electronic modules.

SUMMARY

An exemplary locking and ejecting apparatus is provided for holding an electronic module having at least one connector. The locking and ejecting apparatus includes a carriage defining an entrance for allowing entrance of the electronic module therethrough, a sliding bracket slid in the carriage, a mating connector attached to the sliding bracket for mating with said at least one connector of the electronic module, at least one resilient member placed between the carriage and the sliding bracket for urging the sliding bracket sliding relative to the carriage, a triggering portion formed on one of the carriage and the sliding bracket, and a push-push switch attached to the other of the carriage and the sliding bracket. Two actuated retaining pieces are formed on the push-push switch, and a trigger is set between the retaining pieces. When the electronic module is slid into the carriage via the entrance thereof and the connector of the electronic module is mated with the mating connector, the sliding bracket is pushed inward relative to the carriage and the resilient member is deformed, the trigger of the push-push switch is triggered by pressing of the triggering portion, the retaining pieces of the push-push switch are actuated to hold the triggering portion, the sliding bracket is locked in the carriage and the electronic module is received in the carriage. When the trigger of the push-push switch is triggered by pressing of the triggering portion again, the retaining pieces of the push-push switch are actuated to release the triggering portion, the sliding bracket and the electronic module are pushed by a restoring force of said at least one resilient member, the electronic module is at least partially ejected from the carriage and the connector of the electronic module is departed from the mating connector, thus the electronic module can be completely removed from the carriage.

Other advantages and novel features of the present invention will become more apparent from the following detailed description of an embodiment when taken in conjunction with the accompanying drawings, in which:

DETAILED DESCRIPTION

Figure 1:
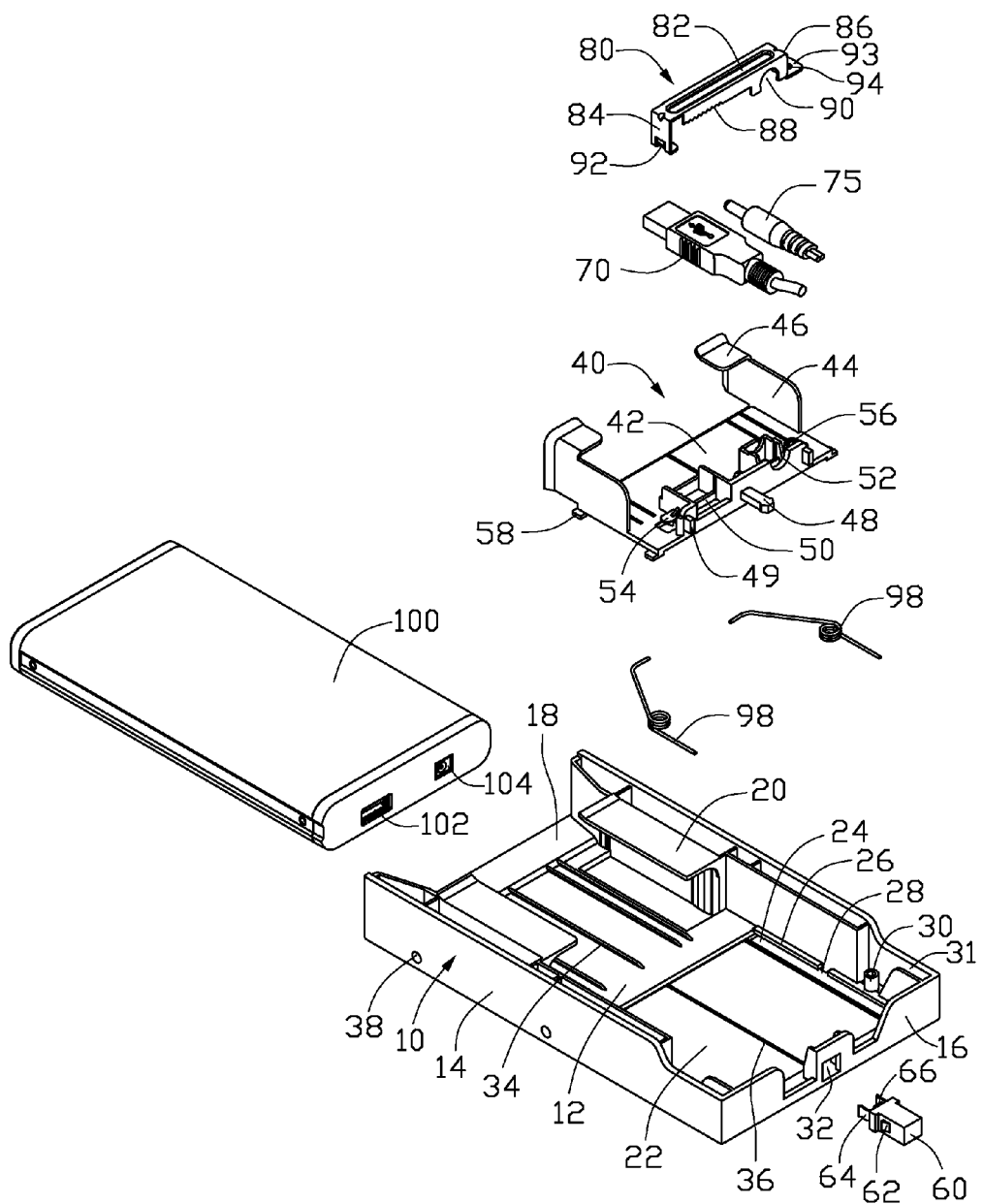
FIG. 1 is an exploded, isometric view of an electronic module locking and ejecting apparatus according to an embodiment, together with an electronic module, the locking and ejecting apparatus including a carriage, a sliding bracket, a push-push switch, two resilient members, two connectors, and an installing member.

Referring to FIG. 1, in an embodiment, an electronic module locking and ejecting apparatus is secured in a computer chassis (not shown) to hold an electronic module therein, such as a drive 100. A female signal connector 102 and a female power connector 104 are set at a back of the drive 100. In the embodiment, the female signal connector 102 is a universal serial bus (USB) type.

The locking and ejecting apparatus includes a carriage 10, a sliding bracket 40 slidably attached to the carriage 10, a push-push switch 60, a USB male signal connector 70, a male power connector 75, an installing member 80, and two resilient members. In the embodiment, the resilient members are two torsion springs 98.

The carriage 10 includes a rectangular bottom wall 12, two elongated sidewalls 14 respectively bent upward from opposite sides of the bottom wall 12 in the same direction, and a rear wall 16 bent upward from a back end of the bottom wall 12 and connecting with the elongated sidewalls 14, thus defining an entrance 18 at a front end of the bottom wall 12 to allow entrance of the drive 100 into the carriage 10 therethrough. Two covering portions 20 are respectively bent from top edges of the elongated sidewalls 14 adjacent the entrance 18. A rectangular recessed portion 22 is formed on the bottom wall 12 adjacent the back end of the bottom wall 12. An elongated sliding channel 24 is defined in the recessed portion 22 adjacent each elongated sidewall 14. An elongated restricting strip 26 protrudes from each elongated sidewall 14 and extends into the corresponding sliding channel 24. Two cutouts 28 are defined in each restricting strip 26. A fixing post 30 protrudes from each restricting strip 26 adjacent the corresponding elongated sidewall 14. A locking groove 31 is defined at the back end of the bottom wall 12 adjacent each fixing post 30. A receiving hole 32 is defined in the rear wall 16 for receiving the push-push switch 60 therein. A plurality of slide-aiding ribs 34, 36, along the extending direction of the elongated sidewalls 14, is formed on the front end of the bottom wall 12 and the recessed portion 22 respectively. Two mounting holes 38 are defined in an exterior of each elongated sidewall 14 for fixing the carriage 10 to the computer chassis.

The sliding bracket 40 is slidably placed in the recessed portion 22 of the carriage 10. The sliding bracket 40 includes a base plate 42 and two wing portions 44 respectively bent upward from opposite sides of the base plate 42 in the same direction. An abutting portion 46 is horizontally bent inward from a top edge of each wing portion 44 corresponding to one corresponding covering portion 20 of the carriage 10. Two spaced receiving portions 50, 52 are formed at a rear portion of the base plate 42 between the wing portions 44 for receiving the male signal connector 70 and the male power connector 75 therein respectively. A hook 54 is formed on the base plate 42 adjacent the receiving portion 50, and a fixing hole 56 is defined in the base plate 42 adjacent the receiving portion 52. An elongated triggering portion 48 extends from the rear portion of the base plate 42. A free end of the triggering portion 48 is generally shaped as an arrowhead with two bulges formed at two sides thereof respectively. Two stopping blocks 49 protrude from the rear portion of the base plate 42, from opposite sides away from the triggering portion 48. Four sliding protrusions 58 respectively extend downward from four corners of the base plate 42 corresponding to the cutouts 28 of the carriage 10.

The push-push switch 60 forms two raised stoppers 62 at opposite sides thereof. Two actuated retaining pieces 64 are formed at an end of the push-push switch 60. A trigger 66 is set between the retaining pieces 64. When the trigger 66 is triggered, the retaining pieces 64 are actuated to move to or toward each other; when the trigger 66 is triggered again, the retaining pieces 64 are actuated to move away from each other.

The installing member 80 rides over the receiving portions 50, 52 of the sliding bracket 40 to secure the male signal connector 70 and the male power connector 75. The installing member 80 includes an elongated portion 82 and two securing portions 84, 86 bent downward from two ends of the elongated portion 82 respectively. A saw-toothed clasping portion 88 is formed at one side of the elongated portion 82 corresponding to the receiving portion 50 of the sliding bracket 40. A locking slot 90 is defined at the side of the elongated portion 82 corresponding to the receiving portion 52 of the sliding bracket 40. A notch 92 is defined in the securing portion 84. A horizontal end 93 is bent outward from the securing portion 86, and a through hole 94 is defined in the horizontal end 93.

Figure 2:
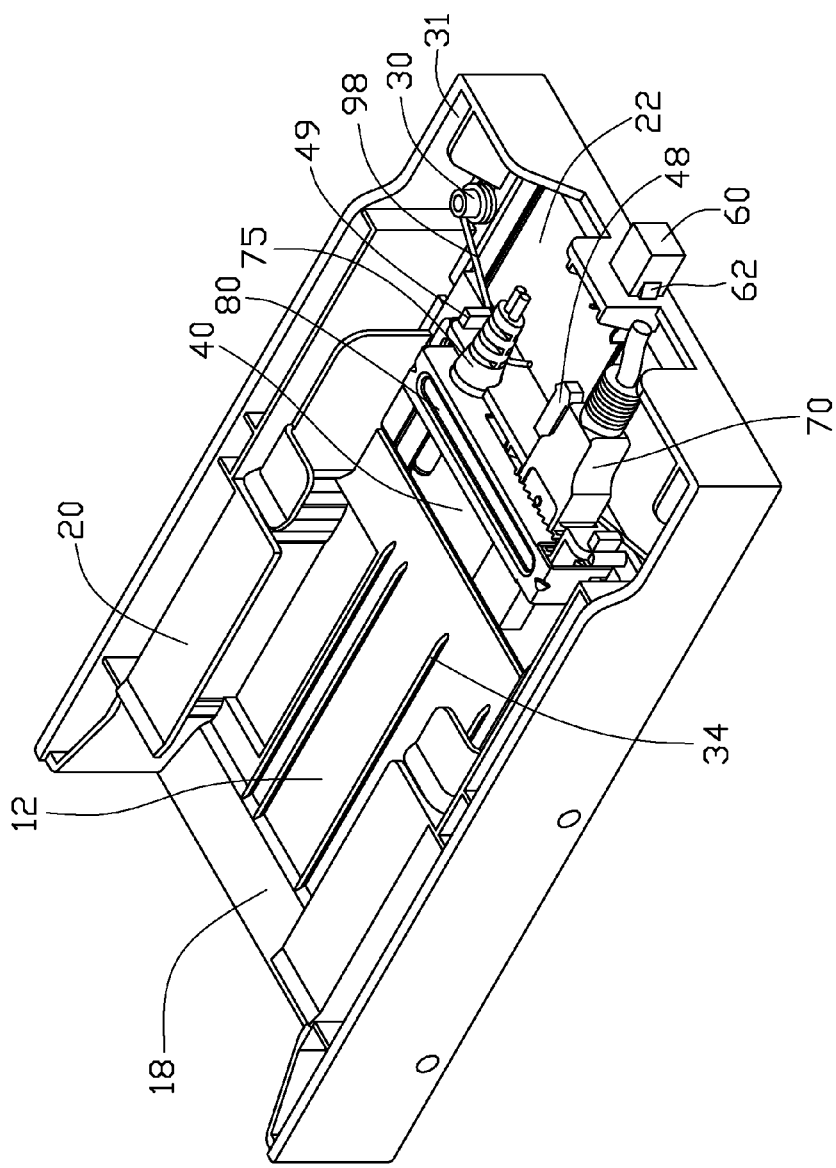
FIG. 2 is an assembled view of the locking and ejecting apparatus of FIG. 1, with the sliding bracket in a first or unlocked position.

Referring also to FIG. 2, in assembly, the triggering portion 48 of the sliding bracket 40 is extended into the receiving hole 32 of the rear wall 16 of the carriage 10. The sliding protrusions 58 are aligned with the corresponding cutouts 28 of the bottom wall 12 of the carriage 10, and slid into the corresponding sliding channels 24 thereof via the cutouts 28. The base plate 42 is slid into the recessed portion 22 of the bottom wall 12 on the slide-aiding ribs 36. The slide-aiding ribs 36 facilitate sliding of the sliding bracket 40. Thus the sliding bracket 40 is slidably placed in the carriage 10. The two torsion springs 98 are respectively attached around the fixing posts 30 of the bottom wall 12. An elongated end of each torsion spring 98 is locked in the corresponding locking groove 31 of the bottom wall 12, and the other elongated end thereof is abutted against the rear portion of the base plate 42 of the sliding bracket 40 and is placed under the corresponding stopping block 49 of the base plate 42. The restoring force of the torsion springs 98 urges the sliding bracket 40 to slide to or stay at a first position relative to the carriage 10. In the first position the triggering portion 48 of the sliding bracket 40 is out of the receiving hole 32 of the rear wall 16. The stopping blocks 49 of the sliding bracket 40 can prevent the torsion springs 98 from coming off the sliding bracket 40 during sliding of the sliding bracket 40.

The push-push switch 60 is pressed in the receiving hole 32 of the rear wall 16 from an inside of the carriage 10 and fixed via the raised stoppers 62 clearing an encircling edge of the receiving hole 32 and being locked at an outer surface of the rear wall 16, and the end of the push-push switch 60, with the retaining pieces 64, is placed inside of the carriage 10. The plug connectors 70, 75 are respectively located in the receiving portions 50, 52 of the sliding bracket 40. The hook 54 of the base plate 42 is inserted into the notch 92 of the securing portion 84 of the installing member 80. The elongated portion 82 of the installing member 80 is pressed, thus the through hole 94 of the horizontal end 93 of the securing portion 86 is aligned with the fixing hole 56 of the base plate 42 of the sliding bracket 40. A screw (not shown) is inserted through the through hole 94 and screwed in the fixing hole 56. The male signal connector 70 and the male power 75 are respectively held in the receiving portions 50, 52 via the saw-toothed clasping portion 88 and the circumferential edge of the locking slot 90 catching the connectors 70, 75.

Figure 3:
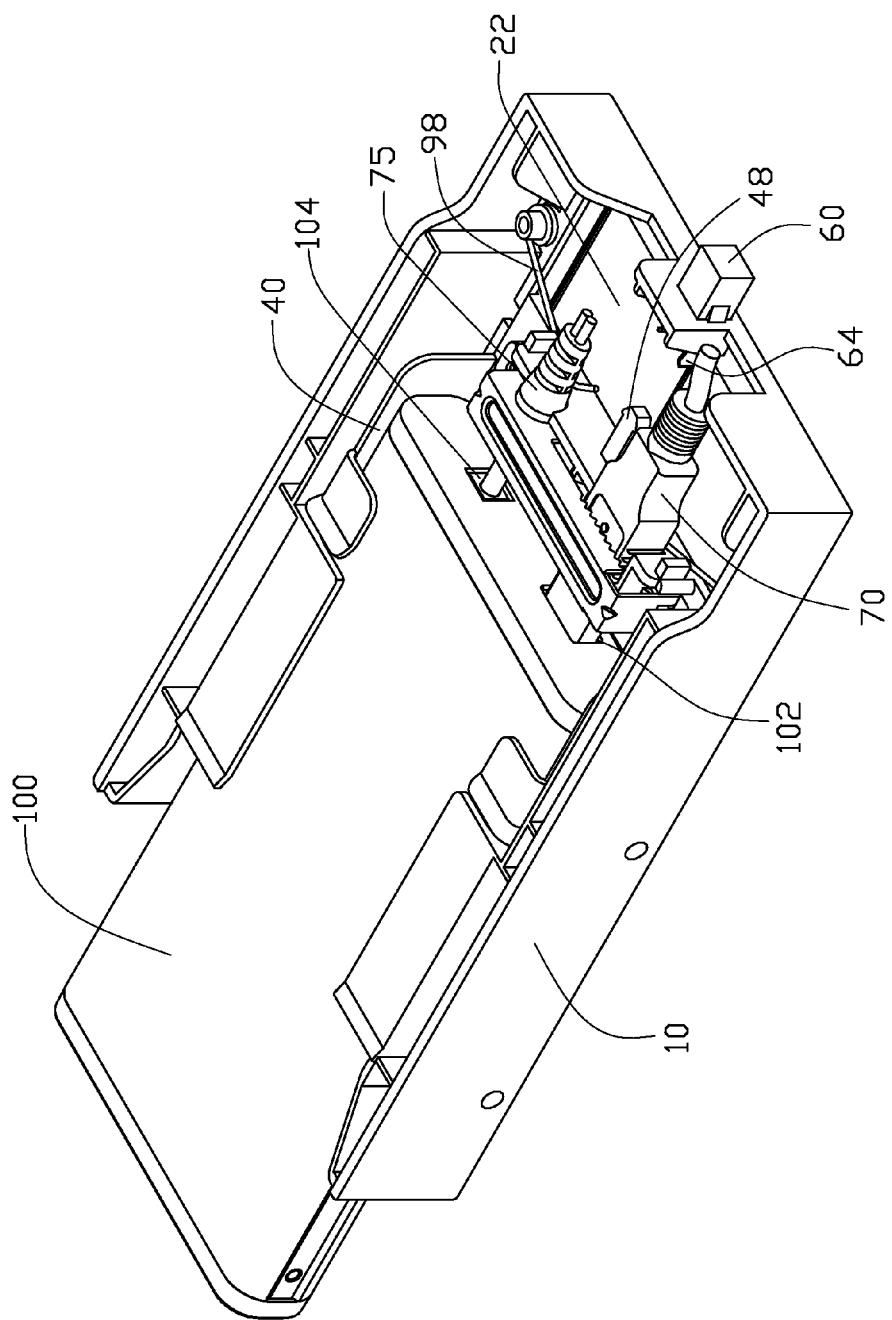
FIG. 3 is an assembled view of FIG. 1, with the electronic module and the sliding bracket in the first position.
Figure 4:
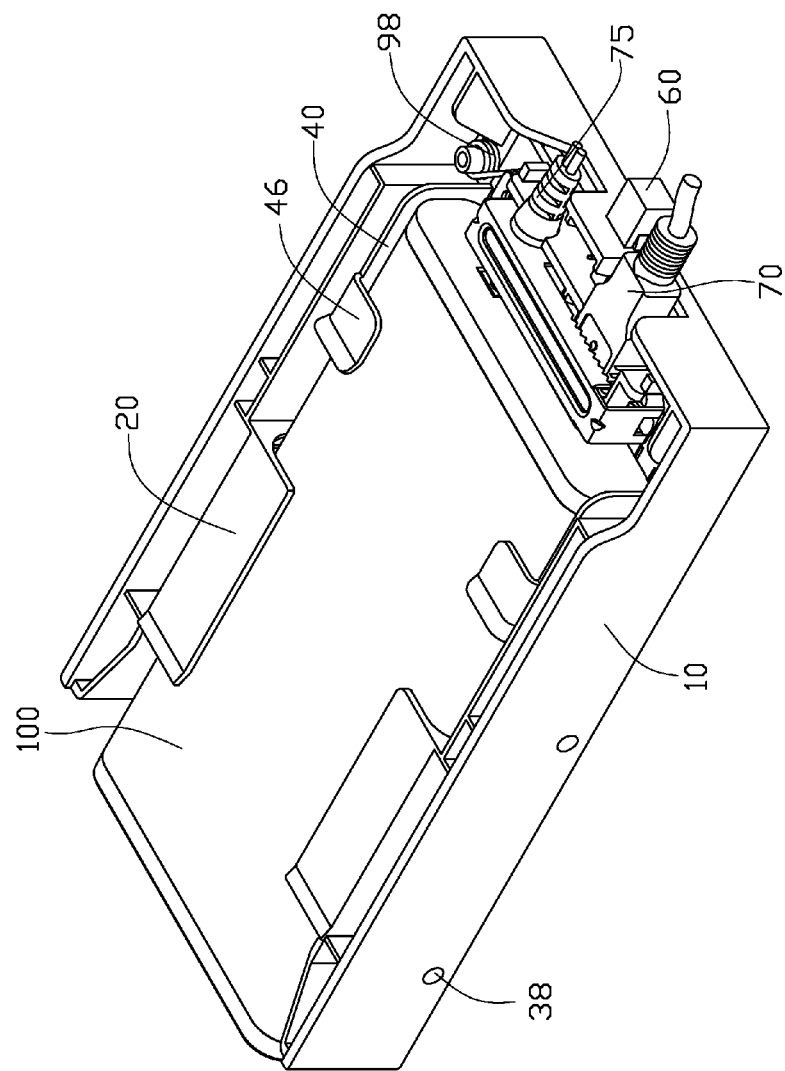
FIG. 4 is similar to FIG. 3, with the electronic module and the sliding bracket in a second or locked position.

Referring also to FIGS. 3 and 4, in use, the carriage 10 is secured to the computer chassis via a plurality of screws being screwed in the mounting holes 38 of the carriage 10. The drive 100 is pushed into the carriage 10 via the entrance 18 thereof and slid on the slide-aiding ribs 34 of the bottom wall 12. When the female signal connector 102 and the female power connector 104 of the drive 100 abut against the male signal connector 70 and the male power connector 75, the sliding bracket 40 is driven together with the drive 100 to slide backward from the first position. The torsion springs 98 are deformed by the rear portion of the sliding bracket 40 pressing the other elongated ends of the torsion springs 98. The male signal connector 70 and the male power connector 75 are respectively inserted in and electrically connected with the female signal connector 102 and the female power connector 104 of the drive 100. When the trigger 66 of the push-push switch 60 is triggered by the triggering portion 48 of the sliding bracket 40, the retaining pieces 64 thereof is actuated to hold the arrowhead-shaped end of the triggering portion 48, thus the sliding bracket 40 is locked in a second position. The drive 100 is received in the carriage 10 and can be accessed by the computer via the male signal connector 70 and the male power connector 75.

To detach the drive 100 from the locking and ejecting apparatus, the drive 100 is pressed inward, thus the trigger 66 of the push-push switch 60 is triggered by pressing of the triggering portion 48 of the sliding bracket 40 again. The retaining pieces 64 of the push-push switch 60 are actuated to release the arrowhead-shaped end of the triggering portion 48. The sliding bracket 40 together with the drive 100 are urged to slide outward relative to the carriage 10 from the second position by the restoring forces of the deformed torsion springs 98. When the four sliding protrusions 58 of the sliding bracket 40 respectively abut against front sections of the corresponding sliding channels 24 of the bottom wall 12, and the abutting portions 46 thereof abut against the covering portions 20 of the elongated sidewalls 14, the sliding bracket 40 is in the first position. A front section of the drive 100 comes out of the entrance 18 of the carriage 10, thus the drive 100 can be readily taken out of the carriage 10.

Alternatively, the female signal connector 102 and the female power connector 104 of the drive 100 can be integrated into one female connector providing both signal and power paths. Correspondingly, the male signal connector 70 and the male power connector 75 can be integrated into one male connector. Further, the triggering portion 48 can instead be formed on the carriage 10, and the push-push switch 60 can be attached to the sliding bracket 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking and ejecting apparatus for holding an electronic module having at least one connector, comprising:
   a carriage defining an entrance for allowing entrance of the electronic module therethrough;
   a sliding bracket slid in the carriage, a mating connector attached to the sliding bracket configured for mating with said at least one connector of the electronic module;

at least one resilient member being placed between the carriage and the sliding bracket configured for urging the sliding bracket sliding relative to the carriage;

a triggering portion formed on one of the carriage and the sliding bracket; and a push-push switch attached to the other of the carriage and the sliding bracket, two actuated retaining pieces being formed on the push-push switch, a trigger set between the retaining pieces;

wherein when the electronic module is slid into the carriage via the entrance thereof and the connector of the electronic module is mated with the mating connector, the sliding bracket is pushed inward relative to the carriage and the resilient member is deformed, the trigger of the push-push switch is triggered by pressing of the triggering portion, the retaining pieces of the push-push switch are actuated to hold the triggering portion, the sliding bracket is locked in the carriage and the electronic module is received in the carriage; when the trigger of the push-push switch is triggered by pressing of the triggering portion again, the retaining pieces of the push-push switch are actuated to release the triggering portion, the sliding bracket and the electronic module are pushed by a restoring force of said at least one resilient member, thus the electronic module is at least partially ejected from the carriage and the connector of the electronic module is departed from the mating connector.

2. The electronic apparatus assembly as described in claim 1, wherein a plurality of slide-aiding ribs is formed on the carriage to facilitate sliding of the electronic module.

3. The locking and ejecting apparatus as described in claim 1, wherein two sliding channels are defined in the carriage, and a plurality of sliding protrusions is formed on the sliding bracket to be slid in the sliding channels of the carriage.

4. The locking and ejecting apparatus as described in claim 3, wherein two restricting strips protrude from the carriage and respectively extend into the corresponding sliding channels, and a plurality of cutouts is defined in each of the restricting strips, and the sliding protrusions of the sliding bracket are slid into the sliding channels via the cutouts of the corresponding restricting strips.

5. The locking and ejecting apparatus as described in claim 2, wherein at least one fixing post and at least one stopping block respectively protrude from the carriage and the sliding bracket, at least one locking groove is defined in the carriage adjacent said at least one fixing post, said at least one resilient member is a torsion spring attached around said at least one fixing post, and an end of the torsion spring is locked in said at least one locking groove of the carriage and the other end of the torsion spring is abutted against said at least one stopping block of the sliding bracket.

6. The locking and ejecting apparatus as described in claim 1, wherein the carriage comprises a bottom wall having a recessed portion formed thereon, and the sliding bracket comprises a base plate slidably placed in the recessed portion of the bottom wall.

7. The locking and ejecting apparatus as described in claim 6, wherein two elongated sidewalls are respectively bent from opposite sides of the bottom wall of the carriage, a covering portion is bent from a top edge of each of the elongated sidewalls, two wing portions are respectively bent from opposite sides of the base plate of the sliding bracket corresponding to the elongated sidewalls, and an abutting portion is bent from a top edge of each of the wing portions corresponding to one covering portion.

8. The locking and ejecting apparatus as described in claim 6, wherein a receiving portion is formed on the bottom wall of the carriage for receiving said at least one mating connector therein.

9. The locking and ejecting apparatus as described in claim 8, further comprising an installing member, the installing member comprises a saw-toothed elongated portion to clasp said at least one mating connector, and two securing portions formed on the elongated portion, a notch and a through hole are respectively defined in the securing portions, a hook is formed on the base plate of the sliding bracket and latched in the notch, a fixing hole is defined in the base plate of the sliding bracket, and a fastener is inserted through the through hole and engaged in the fixing hole, thus securing the installing member to the base plate of the sliding bracket.

10. An electronic apparatus assembly comprising:

an electronic module with at least one electrical connector;

a carriage for receiving the electronic module therein;

a sliding bracket slid in the carriage, a mating electrical connector attached to the sliding bracket corresponding to said at least one electrical connector of the electronic module;

a resilient member secured to the carriage for urging the sliding bracket sliding relative to the carriage;

a triggering portion formed on one of the carriage and the sliding bracket; and a push-push switch attached to the other of the carriage and the sliding bracket, two actuated retaining pieces formed on the push-push switch, a trigger set between the retaining pieces;

wherein when the electronic module is pushed into the carriage and said at least one electrical connector of the electronic module is connected with the mating electrical connector, the sliding bracket is urged to slide inward relative to the carriage and the resilient member is deformed, the trigger of the push-push switch is triggered by pressing of the triggering portion, the retaining pieces of the push-push switch are actuated to hold the triggering portion, thus the sliding bracket is fixed in the carriage and the electronic module is held in the carriage; when the trigger of the push-push switch is triggered by pressing of the triggering portion again, the retaining pieces of the push-push switch are actuated to release the triggering portion, the sliding bracket and the electronic module are ejected out of the carriage by a restoring force of the resilient member, thus the electronic module is removed from the carriage and said at least one electrical connector of the electronic module is departed from the mating electrical connector.

11. The electronic apparatus assembly as described in claim 10, further comprising an installing member, the installing member comprises an elongated portion having a locking slot to catch the mating electrical connector, and two securing portions formed at two ends of the elongated portion respectively and secured to the sliding bracket.

12. The electronic apparatus assembly as described in claim 11, wherein a notch and a through hole are respectively defined in the securing portions, a hook is formed on the sliding bracket and locked in the notch, a fixing hole is defined in the sliding bracket, and a fastener is inserted through the through hole and engaged in the fixing hole, thus securing the installing member to the sliding bracket.

13. The electronic apparatus assembly as described in claim 10, wherein a recessed portion is formed on a bottom of the carriage, two sliding channels are defined in recessed portion, the sliding bracket is slidably received in the recessed portion, and a plurality of sliding protrusions is formed on the sliding bracket to be respectively slid in the sliding channels of recessed portion.

14. The electronic apparatus assembly as described in claim 13, wherein two restricting strips respectively protrude from two sidewalls of the carriage and extend into the corresponding sliding channels, a plurality of cutouts is defined in each of the restricting strips, and the sliding protrusions of the sliding bracket are respectively slid into the sliding channels via the cutouts of the corresponding restricting strips.

15. The electronic apparatus assembly as described in claim 14, wherein a fixing post and a stopping block respectively protrude from the carriage and the sliding bracket, a locking groove is defined in the carriage adjacent the fixing post, the resilient member is a torsion spring attached around the fixing post, and an end of the torsion spring is locked in the locking groove of the carriage and the other end of the torsion spring is abutted against the stopping block of the sliding bracket.

* * * * *